(12) United States Patent
Lee et al.

(10) Patent No.: US 6,657,981 B1
(45) Date of Patent: Dec. 2, 2003

(54) SYSTEM AND METHOD USING PACKET FILTERS FOR WIRELESS NETWORK COMMUNICATION

(75) Inventors: Hong-yuh Lee, Hsinchu (TW);
Ruei-chuan Chang, Taipei (TW);
Liang-yi Huang, Taipei (TW); Mei-ling Chiang, Taipei (TW)

(73) Assignee: Accton Technology Corporation, Taiwan (CN)

( * ) Notice: Subject to any disclaimer, the term of this patent is extended or adjusted under 35 U.S.C. 154(b) by 0 days.

(21) Appl. No.: 09/519,087

(22) Filed: Mar. 6, 2000

(51) Int. Cl.[7] .............................................. H04Q 7/00
(52) U.S. Cl. ..................................... 370/331; 455/436
(58) Field of Search ................................ 370/338, 401; 455/432, 552; 709/238, 245, 321, 324, 327

(56) References Cited

U.S. PATENT DOCUMENTS 6,195,705 B1 * 2/2001 Leung ......................... 709/245
6,393,482 B1 * 5/2002 Rai et al. .................... 709/225
6,473,413 B1 * 10/2002 Chiou et al. ................. 370/331
6,510,151 B1 * 1/2003 Cioli et al. .................. 370/352

* cited by examiner

Primary Examiner—Wellington Chin
Assistant Examiner—Jamal A. Fox
(74) Attorney, Agent, or Firm—Birch, Stewart, Kolasch & Birch, LLP

(57) ABSTRACT

A network communication system is provided for communicating a wired subnet and a wireless subnet to solve the handover problems occurred in roaming. The system includes an IAPP manager program at a user level of the access point for communicating with a kernel-level device driver using system calls to perform an announce procedure and a handover procedure. A wireless LAN card driver with a packet filter is implemented for sending signals to the IAPP manager program to perform the handover procedure upon receiving a reassociation request packet from a mobile host. A wired LAN card driver is implemented for acting as an interface of the wired subnet. And a bridge program with a packet filter is implemented to increase the bandwidth efficiency.

12 Claims, 4 Drawing Sheets

SYSTEM AND METHOD USING PACKET FILTERS FOR WIRELESS NETWORK COMMUNICATION

BACKGROUND OF THE INVENTION

A. Field of the Invention

The present invention provides a wireless network communication system and method for integrating the communication mechanism of mobile IP and IAPP and allowing mobile host to roam among various access points and across different subnets, especially to a wireless network communication system and method using packet filters for reducing unnecessary traffic on the wireless network.

B. Description of the Prior Art

The current IEEE 802.11 standard only defines the protocols below the MAC layer for wireless LAN (hereinafter WLAN). The protocols on network layer have not been defined for WLAN yet. The communication among the Access Points (AP) in the WLANs is following the communication mechanisms defined by the Inter Access Point Protocol (IAPP). Accordingly, the IAPP is implemented on top of UDP/IP following the IEEE 802.11 standard. According to IAPP, the access points can obtain the information about other access points by exchanging broadcast packets. When an access point is initially activated, it broadcasts announce request packets to the WLAN. Other access points in the same WLAN will respond with announce response packets upon receiving the announce request packets. In an announce response packet, it contains the information about the access point, such as the MAC address of the access point. When a mobile host roams to another WLAN served by another access point, the mobile host will send a reassociation request to the new access point. The new access point will have to find the IP address of the access point originally served for the mobile host so as to complete a handover procedure, which will allow the new access point to replace the role of the original access point and provide services for the mobile host.

However, if the mobile host moves to another WLAN in a different IP subnet, the conventional IAPP communication mechanism will be blocked by the router. Consequently, the new access point will not be able to obtain the IP address of the original access point via broadcasting packets. The reason is because most routers are configured to block the traffic of broadcast packets so as to prevent the occurrence of broadcast storm. For this reason, access points in different IP subnets will not be able to obtain the IP address of another access point in different IP subnet via broadcasting packets. In other words, when a new access point receives a reassociation request from a mobile host, it has no way to get the IP address of the original access point if they are in different IP subnets. Consequently, a handover procedure will not be completed. As a result, the mobile host can only roam among various access points in the same subnet. Moreover, if the access points continuously broadcast the individual access point information to the access points in various subnets, it will inevitably increase the network traffic and reduce the bandwidth.

On the other hand, Mobile IP is a protocol defined for the, WLAN communication. Mobile IP defines the communication protocol on the network layer for allowing mobile hosts to roam among different subnets. Mobile IP depends on the Agents in each WLAN to record the current IP address of the mobile host. Whenever a mobile host moves from one WLAN to another WLAN, the new Agent will encapsulate the packets destined for the mobile host, and then forward the encapsulated packets to the mobile host according to its new IP address. Thus, the mobile host can roam among various subnets and still be able to receive/transmit data as usual.

Currently, since the mobile IP and IAPP are defined based on different network layers, so there is no solution for integrating the mobile IP and IAPP yet. Thus, it would be desirable to provide a method and system for integrating the mobile IP and IAPP communication mechanism.

SUMMARY OF THE INVENTION

Accordingly, it is a primary object of the present invention to provide a wirelss network card driver and IAPP manager program with packet filters for communicating the wired LAN and wireless LAN, thereby to allow the mobile hosts to roam among various Basic Service Stations (RSS) in the same subnet.

It is another object of the present invention to provide a system and method for integrating the communication mechanism of mobile IP and IAPP on an access point, thereby allowing the mobile hosts to roam across different subnets.

It is still another object of the present invention to provide a communication system and method for filtering out unnecessary packet transmission, thereby to reduce the traffic on the wireless LAN.

Accordingly, the present invention implements an access point following the IAPP protocol to solve the handover problem occurred when the mobile hosts roam among different Basic Service Sets in the same subnet. Moreover, the present invention integrates the IAPP and Mobile IP technology on the access points to allow the mobile hosts to roam across different subnets. The present invention also provides the packet filters in the wireless LAN card driver and the bridge program for reducing the unnecessary traffic of packet transmission, and increasing the bandwidth efficiency of the wireless networks.

The communication system of the present invention mainly includes: an IAPP manager program in the user level of the access point for performing IAPP communication procedure and maintaining a mapping table for storing the physical address and the associated IP address of an access point. It also includes a wireless LAN card driver in the kernel level of the access point for performing IAPP communication procedure in response to the system calls of the IAPP manager program. The wireless LAN card driver includes a packet filter for determining if an incoming packet will be forwarded to the WLAN. The wired LAN card driver is connected to the wired LAN and acts as an interface for the wired LAN. A bridge program acts as an interface for communicating the wired LAN card driver and the wireless LAN card driver. The bridge program also includes a packet filter for controlling the traffic flow towards the WLAN.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

The present invention provides a system and method for integrating the IAPP and the mobile IP communication mechanisms on an access point. The integrated communication mechanism allows a mobile host to roam among various BSS in the same subnet as well as in different subnets. The problems occurred on the handoff procedure as described above has also been solved according to the method and system of the invention.

Figure 1:
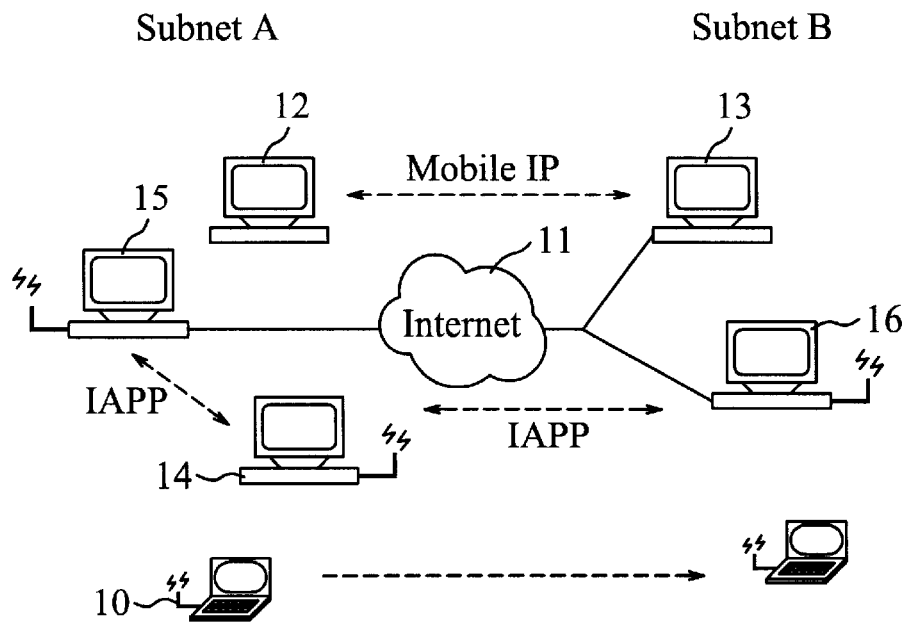
FIG. 1 is a schematic diagram showing the structure of the present invention.

Refer to FIG. 1, the Internet 11 consists of at least 2 different IP subnets A and B. The subnet of A and B has a Mobile IP Agent 12, 13, represented as Home Agent and Foreign Agent respectively, for providing services on the network layer for a mobile host 10. The Mobile IP Agent 12, or 13 communicates with another Mobile IP Agent via Mobile IP communication mechanism. There are several access points 14, 15, 16 in the different subnets A, B to provide services over the entire network. Each access point communicates with one another via IAPP communication mechanism. Moreover, the access points 14, 16 of different subnets can directly communicate with one another by IAPP communication mechanism.

Figure 2:
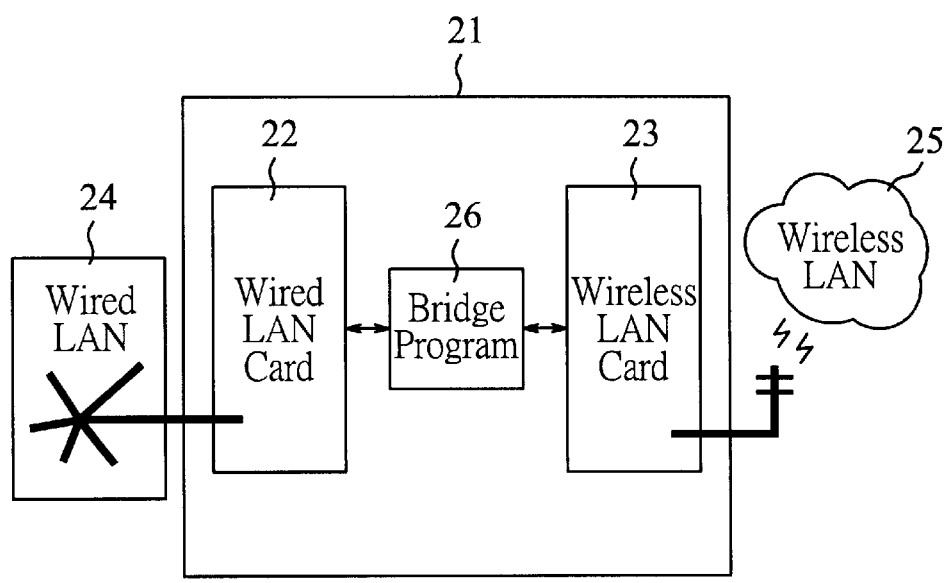
FIG. 2 is a schematic diagram showing the structure of an access point according to the preferred embodiment of the present invention.

To solve the handover problem occurred when the mobile host 10 moves from subnet A to subnet B, the access point 16 of subnet B cannot get the IP address of the access point 14 in subnet A and thus cannot finish the handover procedure, the present invention provides an access point 16 with the structure as illustrated in FIG. 2.

As shown in FIG. 2, in a preferred embodiment of the present invention, the present invention implements an access point 21 on a host computer. In the host computer with Linux environment, a wired LAN card 22 (i.e. an Ethernet card) and a wireless LAN card 23 (i.e. PCMCIA wireless LAN card) are implemented for communicating with the wired LAN 24 and the wireless LAN 25 respectively. The wired LAN card 22 acts as the interface for communicating with the wired LAN 24. On the other hand, the wireless LAN card 23 acts as the interface of the wireless LAN 25. A bridge program 26 is acting as an interface between the wired LAN card 22 and the wireless LAN card 23.

The wirelss LAN card driver follows the IEEE 802.11 standard to process the communication mechanism, including processing the association requests, reassociation requests, and disassociation requests of a mobile host.

Moreover, the present invention provides an IAPP manager program in an access point for processing the IAPP packets according to the IAPP protocol. The IAPP manager program uses UDP/IP protocol for data communication. It mainly includes two procedures, namely, announce and handover procedures for processing four different packet types of announce request, announce response, handover request, and handover response.

Figure 3:
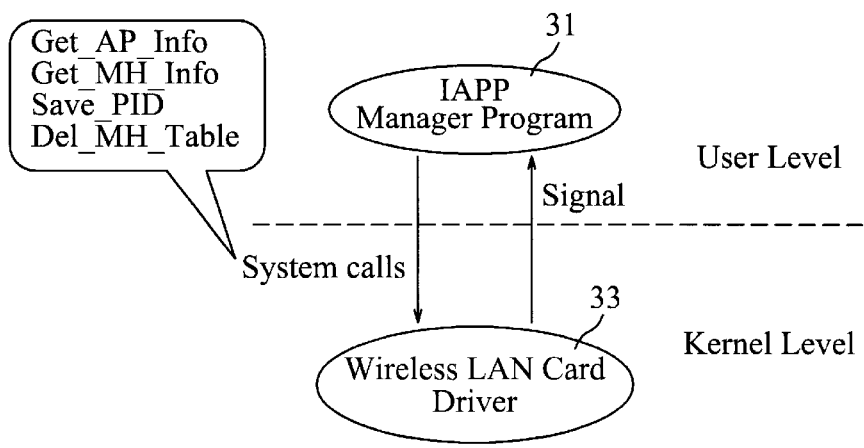
FIG. 3 is a schematic diagram showing the communication between the IAPP manager program and the wireless LAN card driver.

Refer to FIG. 3 for showing the structure and operations of the IAPP manager program. The IAPP manager program 31 is a user level program which can communicate with the wireless LAN card driver 33 by system calls. Its function is like a daemon of a Unix system, acting as an extension to the operating system. The IAPP manager program 31 is an unattended process and initiated at startup. The IAPP manager program 31 that executes in the background is ready to perform an operation whenever required. Since the data in the kernel 25 level is inaccessible to the user level program, so the IAPP manager program 31 uses system calls to get the information about the access point and the mobile host from the wireless LAN card driver 33 which is at the kernel level. The information includes: (1) for the access point: physical address, Station Service ID, and the information about the mobile host; (2) for the mobile host: the physical address, and the physical address of the access point previously registered by a mobile host.

The present invention provides the following system calls for the IAPP manager program 31 at the user level to exchange information with the wireless LAN card driver 33 at the kernel level, including:

1. Get_AP_Info( ): a program function to get the information about the access point.
2. Get_MH_Info( ): a program function to get the information about the mobile host, including: physical address, and the physical address of the access point previously registered by the mobile host.
3. Save_PID( ): a program function for storing the process ID of the IAPP manager program in the wireless LAN card driver.
4. Del_MH_Table( ): a program function executed by the IAPP manager program for deleting the record of a mobile host from a mapping table when the mobile host roams to a new Basic Service Set.

On the other hand, when the wireless LAN card driver 33 of the access point receives the reassociation request packet from the mobile host, the wireless LAN card driver 33 sends. signals to the IAPP manager program 31 to perform the handover procedure.

Figure 4:
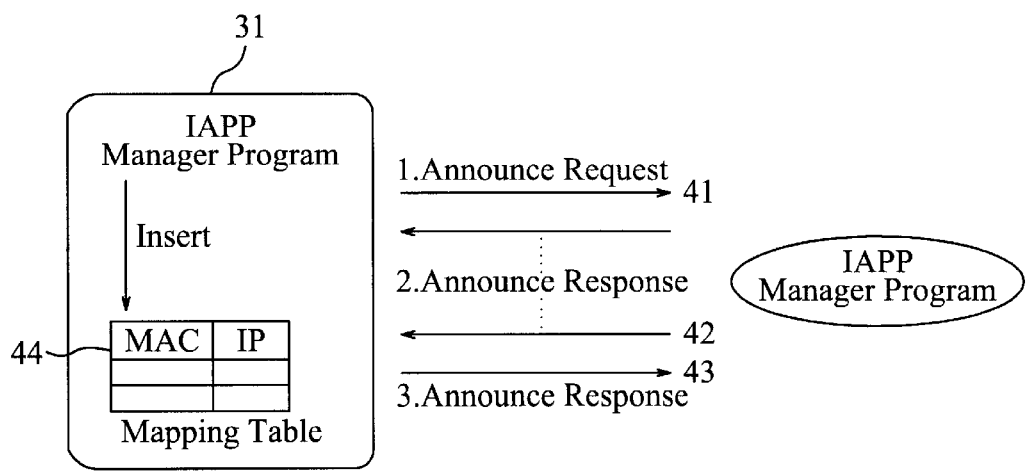
FIG. 4 is a schematic diagram showing the operations of the IAPP manager program when handling an announcement request according to a preferred embodiment of the present invention.
Figure 5:
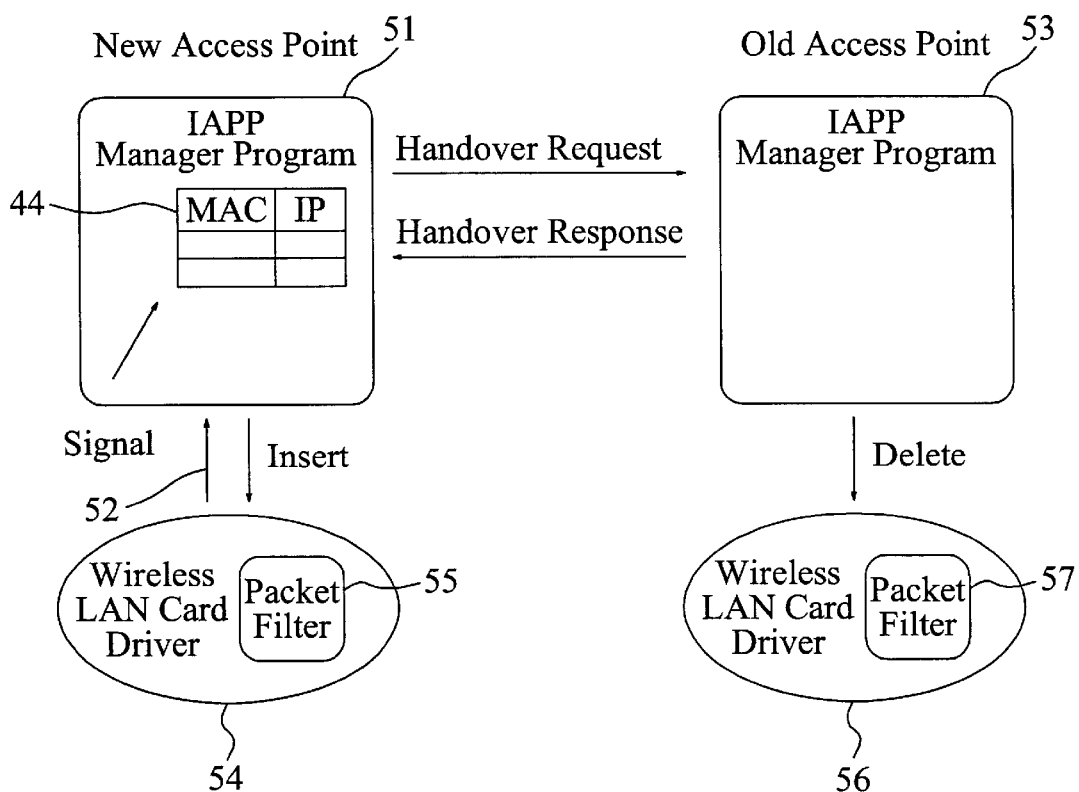
FIG. 5 is a schematic diagram showing the operations of the IAPP manager program when handling a handover request according to a preferred embodiment of the present invention.

Refer to FIG. 4 for showing the operations of the IAPP manager program 31 to process the announce request procedure. Whenever a new access point is initially activated, the new access point broadcasts the announce request packets 41 to the same subnet and other subnets as well.

Since the router is usually configured to block broadcast packets, so the broadcast announce request packets will be directly broadcast to the same subnet as well as other associated subnets using UDP/IP. These associated subnets have been previously recorded in the access point or configured when the access point is initially activated. The information of these associated subnets determines which subnet should be selected for sending the announce request packets. Since the IP address of each access point can be obtained from an announce response packet, so the access point can establish a mapping table 44 for storing the physical address (MAC) and its associated IP address (IP) according to each announce response packet received. Thus, the mapping table 44 can collect and provide the information required for sending handover request packets.

The operations of the IAPP manager program can be described in detail as follows:

First, when the IAPP manager program of an access point is initially activated, it can use Get_AP_Info system call to communicate with the wireless LAN card driver and obtain the physical address of the wireless LAN card. Thus, the physical address of the wireless LAN card acts as the Basic Service Set Identification number (BSSID) of that access point. Then, the BSSID will be filled into the header of the announce request packet which will then be broadcast to the current subnet of the access point and to other subnets. After that, the IAPP manager program 31 waits for announce response packets from other access points.

Afterwards, if the IAPP manager program 31 receives the announce response packets 42 from other access points existing in the same or other subnets, then the IAPP manager program 31 will respond with an announce response packet 43. In addition, the IAPP manager program 31 will also get the physical address and the IP address of the access point from the header of the announce response packets received. Then, the physical address and the IP address of the access point are kept in a mapping table 44 for the convenience of lookup at the time of transmitting handover request packets.

With the mapping table 44, it would be easy to find the associated IP address of an access point previously registered by a roaming mobile host. When the mobile host roams from a BSS to another BSS, the mobile host would register to the new access point by sending a reassociation request packet. The new access point in turn will send a handover request packet to the old access point previously registered by the roaming mobile host according to its IP address. However, the reassociation request packet contains only the physical address of the old access point rather than its IP address. Thus, the IAPP manager program 31 will have to find the IP address of the old access point by looking up the mapping table 44 using the physical address of the old access point as an index. After finding a match, the IP address found will be used as the destination address of the handover request packet.

The handover procedure is the most important procedure for the entire IAPP manager program 31. When the wireless LAN card driver 33 of the access point receives the reassociation request packets from the mobile host, the wireless LAN card driver 33 sends signals to inform the IAPP manager program 31 to process the handover program 51 in response to a reassociation request from a roaming mobile host. When the IAPP manager program 51 receives the signals from the wireless LAN card driver 54, it indicates that a new mobile host has roamed to the BSS of the current access point. At that time, IAPP manager program 51 has to notify the old access point previously registered by the mobile host about the new location of the mobile host. First, IAPP manager program 51 uses Get_MH_Info system call to get the physical address of the old access point of the mobile host. Then, IAPP manager program 51 searches the mapping table 44 to find the IP address of the old access point using its physical address as an index. The IP address found will be served as the destination address of the handover request packet. After that, the IAPP manager program 51 sends the handover request packet to the old access point 53 according to the destination address and then waits for response.

At this time, in addition to sending the handover request packets, the wireless LAN card driver 54 of the current access point also inserts the information of the newly registered mobile host into the packet filter 55. Thus, every mobile host successfully registered in the current subnet will have a record in the packet filter 55. Accordingly, whenever the wireless LAN card driver 54 receives an incoming packet, it searches the packet filter 55 first to find if there is a correspondence between an entry of the packet filter 55 and the destination address of the incoming packet. If there is no match, it indicates that the mobile host has roamed away from the current BSS, so the incoming packet will not be forwarded to its destination. Eventually, the traffic on the WLAN can be reduced.

On the other hand, upon receiving the handover request packet, WLAN can be reduced.

On the other hand, upon receiving the handover request packet, the access point, which was previously registered by the mobile host, will send the handover response packet and use Del_MH_Table system call to simultaneously communicate with the wireless LAN card driver 56 and delete the physical address of the mobile host from the packet filter 57. Thus, checking if the mobile host is still within the BSS can be easily performed by searching the packet filter 57. If the mobile host has roamed to another BSS, the wireless LAN card driver will not forward the packets to the WLAN upon receiving an incoming packet. Consequently, the packet traffic can be efficiently reduced.

The IAPP communication mechanism is sufficient for processing the roaming of the mobile host in the same subnet. However, when the mobile host is roaming across different subnets, it relies on mobile IP communication mechanism to handle the roaming of the mobile host.

According to the Mobile IP defined by Internet Engineering Task Force(IETF), each Agent periodically unicasts its message to its own subnet. When an access point receives the unicast packet, it also forwards the unicast packet to WLAN. Under the infrastructure of the wireless networks, each access point also periodically broadcasts message about itself to the same subnet. However, a mobile host determines its own BSS position according to the beacons of the access point, rather than the packets broadcast by the Agents. Thus, the access point of the invention does not have to periodically braodcast packets for the Agents. Instead, it only broadcasts the message forwarded by the Agent whenever required so to prevent from wasting the bandwidth of the wireless LAN. If the access point does not forward the broadcast packets for the Agents, then the mobile host has no way to determine if it has been roamed to another subnet served by another Mobile IP Agent.

To further reduce unnecessary traffic on the wireless LAN, the invention includes a packet filter in the bridge program for analyzing the destination of the incoming broadcast packets. Only when a mobile host is registering to the access point, will the bridge program forward the broadcast packets for the Agents to the WLAN. In that case, the mobile host can determine if it has been roamed to another subnet served by another Mobile IP Agent and perform Mobile IP communication mechanism. After the mobile host finishes the registration procedure, the bridge program stops forwarding the broadcast packets so as to further reduce the traffic to the WLAN.

Figure 6:
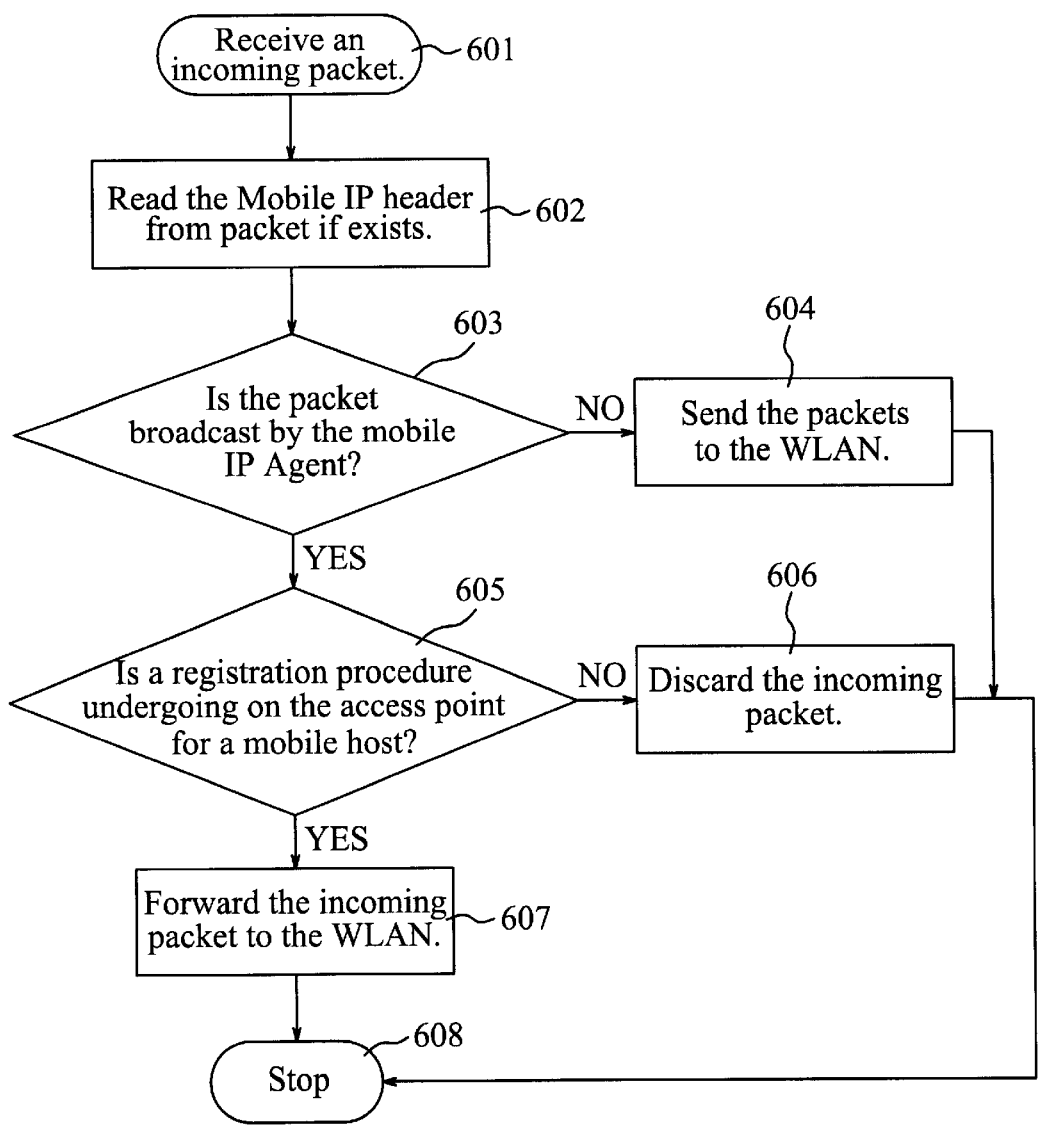
FIG. 6 is a flowchart showing the operations of the packet filters in the bridge program.

The operations of the packet filter in the bridge program can be illustrated in FIG. 6:

Step 601: Receive an incoming packet.

Step 602: Read the Mobile IP header from the packet if exists.

Step 603: Determine if the packet is broadcast by the mobile IP Agent? If not, go to step 604. If yes, go to step 605.

Step 604: Send the packets to the WLAN. And go to step 608.Step 605: Determine if there is a registration procedure undergoing on the access point for a mobile host at this moment? If not, go to step 606. If yes, go to step 607.

Step 606: Discard the incoming packet. And go to step 608.

Step 607: If the mobile host has been registered to the access point, forward the incoming packet to the WLAN.

Step 608: Stop.

To complete the announce procedure, each access point must include the following data: when sending the announce request packet, it requires Station Service ID to indicate the BSS of the mobile host, BSS, physical communication type for indicating the wireless communication type used by the mobile host, including direct sequence or frequency hopping, channel number for illustrating the frequency of the access point.

In sending announce response, it requires SSID, BSS, physical communication type, announce cycle for recording the intervals (120 seconds as default) between each announce response for the access point, Beacon cycle for recording the intervals between each Beacon, handover timeout for indicating the time for completing the handover procedure (500 ms as default), and channel number, and the information about the previously registered mobile host.

To complete the handover procedure, each access point must include the following data: for handover request packets, it requires SSID, BSS, and previous BSSID, the physical address of the mobile host, and message ID for distinguishing the messages and preventing from repeatedly forwarding the same messages.

To complete the handover response procedure, the data required is the same as that of processing the handover request packet.

While this invention has been described. with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A network communication system on an access point for communicating a wired subnet and a wireless subnet, comprising:

an IAPP manager program at a user level of said access point for communicating with a kernel-level device driver by system calls to perform an announce procedure and a handover procedure, and maintain a mapping table, said mapping table comprising a physical address and an IP address of each associated access point;

a wireless LAN card driver at a kernel level of said access point for sending signals to said IAPP manager program to perform said handover procedure upon receiving a reassociation request packet from a mobile host, said wireless LAN card driver comprising a first packet filter for determining if an incoming packet is to be forwarded to said wireless subnet according to a registration record of said mobile host;

a wired LAN card driver at said kernel level of said access point acting as an interface of said wired subnet; and a bridge program for interfacing between said wired LAN card driver and said wireless LAN card driver, said bridge program having a second packet filter for determining if said incoming packet is to be forwarded to said wireless subnet according to a registration record of said mobile host.

2. The network communication system as claimed in claim 1, wherein said IAPP manager program comprises:
means for getting the information of an access point.

3. The network communication system as claimed in claim 1, wherein said IAPP manager program comprises:
means for getting a physical address of a mobile host and a physical address of an access point previously registered by said mobile host.

4. The network communication system as claimed in claim 1, wherein said IAPP manager program comprises:
means for storing each process ID of said IAPP manager program in said wireless LAN card driver.

5. The network communication system as claimed in claim 1, wherein said IAPP manager program comprises:
means for deleting from said first packet filter a physical address of a mobile host after said mobile host has roamed away.

6. The network communication system as claimed in claim 1, wherein said mapping table records an IP address and a physical address of an access point read from each incoming announce response packet in response to an announce request.

7. The network communication system as claimed in claim 1, wherein said IAPP manager program uses UDP/IP for data transmission.

8. A method of wireless network communication for communicating a wired subnet and a wireless subnet on an access point, said access point having a wireless LAN card driver with a first packet filter, a wired LAN card driver implemented at its kernel level, and a bridge program with a second packet filter, comprising the steps of:

providing an IAPP manager program for using system calls to get a physical address of said wireless LAN card driver when said access point is initially activated, said physical address acting as a BSSID of an announce request packet which is broadcast simultaneously to a current subnet of said access point and associated subnets;

reading, in response to an incoming announce response packet, the physical address and the IP address of said incoming announce response packet, and building a mapping table for storing said physical address and said IP address of an access point read from said incoming announce response packet;

signaling said IAPP manager program by said wireless LAN card driver in response to a reassociation request packet to get the physical address of previously registered access point read from said reassociation request packet, and lookup an: associated IP address from said mapping table, and said associated IP address acting as a destination address for a handover request packet, and simultaneously insert the physical address of mobile host read from said reassociation request packet to said first packet filter;

calling said wireless LAN card driver by system calls in response to a handover request packet, and said wireless LAN card driver simultaneously deleting the registration record indicated by the hardware address of said handover request packet from said first packet filter;

determining, in response to an incoming packet with a Mobile IP header, if said incoming packet is broadcast by Mobile IP Agent;

when determining said incoming packet is broadcast by Mobile IP Agent, and no registration procedure is undergoing on the access point for a mobile host, rejecting to forward said incoming packet.

9. The method as claimed in claim 8, further comprising the step of:

forwarding said incoming packet to said wireless subnet when determining that said incoming packet is broadcast by a Mobile IP Agent and a registration procedure is undergoing on the access point for a mobile host.

10. The method as claimed in claim 8, wherein; said announce request packet comprises:

Station Service Identification number (SSID), Basic Service Set (BSS), physical communication type, and channel number.

11. The method as claimed in claim 8, wherein said announce response packet comprises:

Station Service Identification number (SSID), Basic Service Set(BSS), physical communication type, announce cycle time, Beacon cycle time, Handover Timeout, and channel number.

12. The method as claimed in claim 8, wherein said handover request packets and said handover response packets comprise:

Station Service Identification number (SSID), Basic Service Set(BSS), Basic Service Set Identification number (BSSID), a physical address of a mobile host, and message Identification number.

* * * * *